United States Patent [19]

Mullen

[11] Patent Number: 4,744,533
[45] Date of Patent: May 17, 1988

[54] MODULAR SPACE STATION

[76] Inventor: Charles F. Mullen, 204 Yacht Club La., Seabrook, Tex. 77586

[21] Appl. No.: 900,094

[22] Filed: Aug. 25, 1986

[51] Int. Cl.$^4$ .............................................. B64G 1/12
[52] U.S. Cl. .................................................. 244/159
[58] Field of Search .......................... 244/158 R, 159; 52/79.1, 79.5, 79.7, 79.12

[56] References Cited

U.S. PATENT DOCUMENTS

| 3,332,640 | 7/1967 | Nesheim | 244/159 |
| 3,566,554 | 3/1971 | Schaffer et al. | 52/79.7 |
| 3,792,558 | 2/1974 | Berce et al. | 52/79.7 |
| 3,822,569 | 7/1974 | Lautrup-Larsen | 52/79.1 |
| 4,057,207 | 11/1977 | Hogan | 244/159 |

FOREIGN PATENT DOCUMENTS 2704844  9/1977  Fed. Rep. of Germany ...... 244/159

Primary Examiner—Jeffrey V. Nase
Assistant Examiner—Rodney Corl
Attorney, Agent, or Firm—Kenneth A. Roddy

[57] ABSTRACT

A modular space station having a central enclosed area is erected in earth orbit from modules transported by a reusable space shuttle or an expendable rocket. A plurality of modules are peripherally joined in a pattern enclosing a central interior area. In one embodiment, habitable modules are joined side by side to form exterior walls enclosing a central area which is usable space for various purposes and capable of supporting life. Other embodiments are disclosed in which modules are joined by panels cooperating to enclose a central area. Adapter modules may be secured to the modules and having various devices such as docking ports for docking space craft to the station and thrust generating or communication device. The modular space stations may be repetitively joined with similar modular space stations to provide increasingly larger space stations.

29 Claims, 2 Drawing Sheets

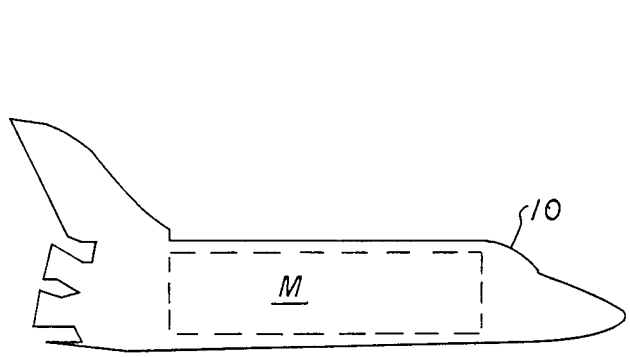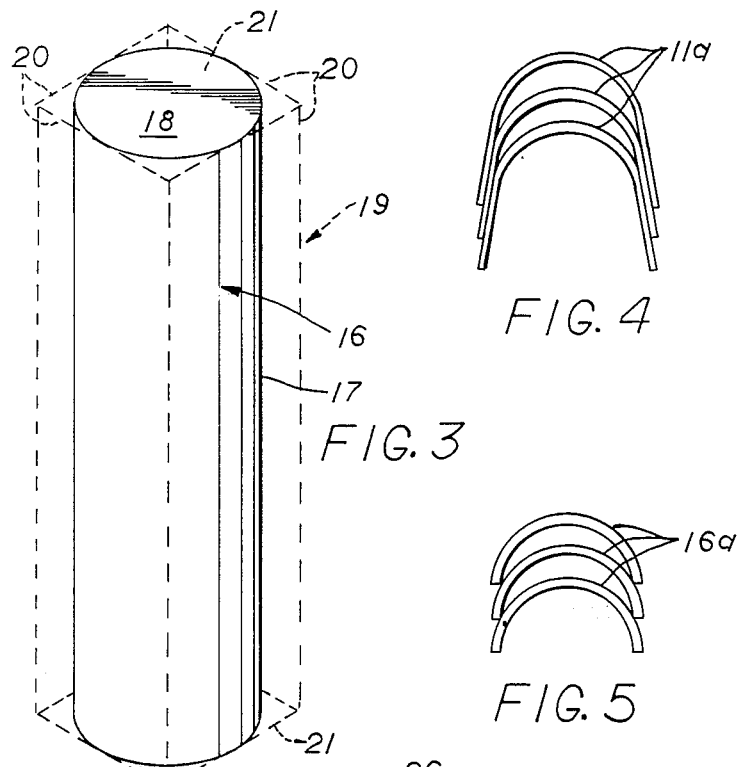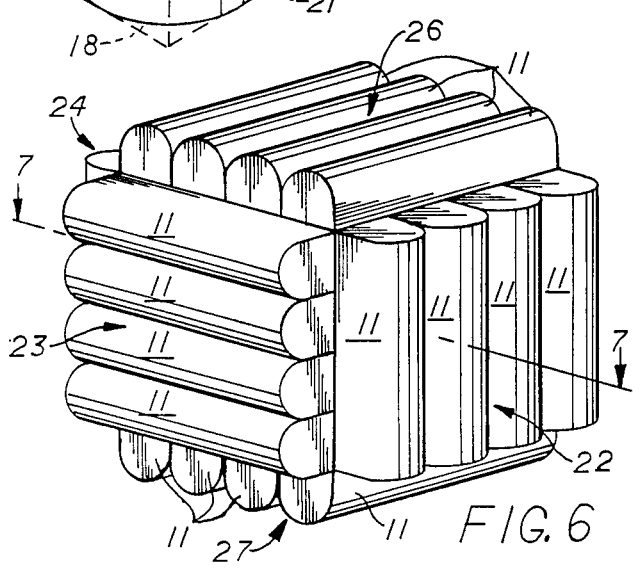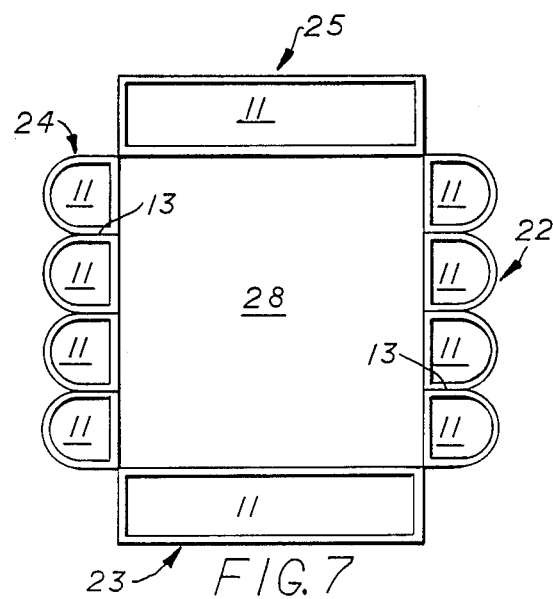

MODULAR SPACE STATION

BACKGROUND OF THE INVENTION

1. Field of the Invention

This invention relates generally to modular space stations, and more particularly to a modular space station structure having a central enclosed area and erected in earth orbit from modules transported in the payload bay of a space shuttle or by an expendable rocket.

2. Brief Description of the Prior Art

Toroidal space stations have been designed that could be lifted into earth orbit in one shot, and then deployed out to their operational form. The more recent Skylab is an example of a one-shot space station that was put into earth orbit. Severe size and weight restrictions of such one-shot space stations limit the effective working life of the space station and limit the exhaustible staples required to support life for its inhabitants. The size and weight restrictions also limit other necessities such as providing artificial gravity to overcome the effect of weightlessness over extended periods of time.

Very large self-sufficient space stations have also been proposed which would support many forms of terrestrial life. Most self-supporting space stations would be so large as to make it impractical to erect them piecemeal on earth and lift them piece by piece to be assembled in earth orbit. It has been suggested that they may have to be fabricated in earth orbit from raw materials carried on a space shuttle or from earth's moon.

The large wheel-like structures are a result of the concept that artificial gravity would be necessary for long-term habitation. The current state of the art has replaced the wheel designs with living and working modules connected together around a hub with outwardly extending feelers, collectors and manipulators which resemble a robotic spider.

State of the art "clustered module" concepts have been proposed by the National Aeronautics and Space Administration (NASA) and from NASA contractors such as McDonnell Douglas Astronautics Co., TRW Space and Technology Group, Rockwell International, and Boeing Aerospace Company.

The above mentioned "clustered modules" are aggregations or conglomerations which feature a central open frame structure having various cylindrical modules spaced thereabout and connected together by a network of pressurized tubes. The modules are interconnected by joining them together end to end or joining their ends together with pressurized tubes. Later shuttle trips would add modules or appendages to that basic structure. The modules are suggested to be approximately 14 ft. in diameter by 24 ft. long. The volume of each such cylinder would be 3,700 cu. ft. One of these cylinders would house a crew of six to eight astronauts. The disadvantage of the current clustered module designs is that the total area is linear and there is no central enclosure, resulting in segmented crowded habitable areas.

The present invention provides a central enclosed habitable area for various uses. In accordance with the present invention, 24 modules approximately 15 ft. by 15 ft. by 60 ft. long would provide an outer area (total module area) of 324,000 cu.ft., and a central enclosure of 216,000 cu.ft. The present invention would provide total usable area of 540,000 cu. ft. whereas the equivalent number of modules of the prior art and currently proposed space stations would provide only 177,600 cu. ft. with no central enclosure.

There are several patents which disclose space modules capable of forming various space station configurations, most of which consist of a ring-like shape having a central hub. Others provide various modules to serve as the core of the station structure.

Hogan, U.S. Pat. No. 4,057,207 discloses a module having the geometry of joined truncated icosohedra, which when a plurality of them are joined together, form a space vehicle. The vehicle formed would consist of two types of rings or four varieties of helices. The helical configuration would allow simple gravity to be generated by way of rotation and also serve as a habitable framework about which a large cylindrical space structure could be built.

Schneider et al, U.S. Pat. No. 4,579,302 discloses a shuttle-launch triangular space station deployable in earth orbit. The framework is comprised of three trusses having generally planar faces comprised of foldable struts which expand and lock into structural engagement forming a repetition of equilateral triangles and non-folding struts interconnecting the two faces. Cylindrical modules may be secured to the three apexes of the framework and connected together by tunnels. The modules may be used for habitat, logistics, service, and laboratory.

Berglund, U.S. Pat. No. 3,169,725 discloses a compact folded space station which is collapsed and transported in the payload bay of a launch vehicle. The station utilizes rigid cylindrical sections, equipped for life support and experiments before launch, joined together by flexible connectors. These sections are connected to a central hub and are erectable to form a rigid hexagonal, tubular ring thereabout in earth orbit. The sections are connected to the hub by spoke-like telescoping struts and may also be interconnected by inflatable access tubes.

Nesheim, U.S. Pat. No. 3,332,640 discloses a preassembled space station comprising tubular sections pivotally connected end to end to form a ring-like structure.

The present invention is distinguished over the prior art in general, and these patents in particular by a modular space station having a central enclosed area which is erected in earth orbit from modules transported in the payload bay of a space shuttle or by an expendable rocket. A plurality of modules are peripherally joined in a pattern to enclose a central interior area. In one embodiment, individual habitable modules are joined side by side to form exterior walls of a central interior area which is usable space for various purposes and capable of supporting life. Other embodiments are disclosed in which modules are joined by panels extending therebetween to enclose the central interior area. Adapter modules may be secured to the modules and having various devices such as docking ports for docking space craft to the modules and thrust generating or communication devices. The modular space stations may be repetitively joined with similar modular space stations to provide increasingly larger space stations.

SUMMARY OF THE INVENTION

It is therefore an object of the present invention to provide a modular space station structure having a central enclosed area and erected in earth orbit from modules transported in the payload bay of a space shuttle.

It is another object of this invention to provide a modular space station structure having a common central enclosed area surrounded by habitable modules.

Another object of this invention is to provide an efficient method of creating enclosed space stations utilizing habitable modules as the building blocks forming the enclosure.

Another object of this invention is to provide a method of constructing a modular space station in earth orbit to produce maximum habitable area with a minimum amount of material and construction.

Another object of this invention is to provide a method of constructing a modular space station in earth orbit to produce a large usable area capable of supporting colonies of human inhabitants.

A further object of this invention is to provide a modular space station capable of being repetively joined with similar modular space stations to provide increasingly larger space stations.

A still further object of this invention is to provide a modular space station structure which is economical to manufacture and may erected easily and quickly in earth orbit.

Other objects of the invention will become apparent from time to time throughout the specification and claims as hereinafter related.

The above noted objects and other objects of the invention are accomplished by a modular space station having a central enclosed area erected in earth orbit from modules transported in the payload bay of a space shuttle or by expendable rockets. A plurality of modules are peripherally joined in a pattern to enclose the central interior area. In one embodiment, individual habitable modules are joined side by side to form the exterior walls enclosing the central interior area which then becomes usable space for various purposes and capable of supporting terrestrial life. Other embodiments are disclosed in which individual modules are joined by a series of panels extending therebetween for enclosing the central interior area. Adapter modules may be secured to the modules and provided with various devices such as docking ports for docking space craft to the modules and thrust generating or communication devices. The modular space stations may be repetitively joined with similar modular space stations to provide increasingly larger space stations.

BRIEF DESCRIPTION OF THE DRAWINGS

FIG. 1 is a side elevation of a space shuttle having one or more modules contained within the payload bay.

FIG. 2 is an isometric view of a module for use in constructing a space station in accordance with the present invention.

FIG. 3 is an isometric view of a cylindrical module with a rectangular module superposed thereon in dotted line.

FIGS. 4 and 5 are transverse cross sections of the modules of FIG. 3 modified for stacking within the payload bay of a space shuttle.

FIG. 6 is a diagrammatic and isometric view of a plurality of modules joined to form a space station having a central common enclosure.

FIG. 7 is a cross section view of the space station of FIG. 6 taken along line 7—7.

DESCRIPTION OF THE PREFERRED EMBODIMENT

Figure 8:
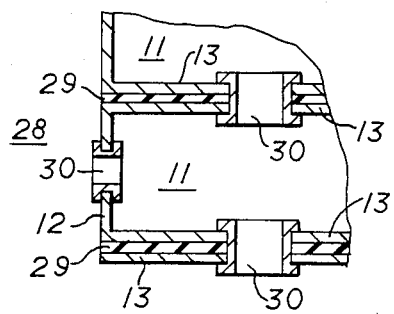
FIG. 8 is a cross section view through a pair of adjoining modules.

Referring to the drawings by numerals of reference, there is shown in FIG. 1, a space shuttle 10 having one or more modules M transported in its payload bay. The modules are of a size and shape to substantially follow the geometry of the payload interior. Currently, the payload bay area of space shuttles is approximately 60 ft. long by 15 ft. wide and 15 ft. in height, with the top or bay doors following an arcuate contour. The modules may also be transported individually as the payload on expendable rockets.

Ideally, as shown in FIG. 2, a preferred module 11 (illustrated in a vertical position) comprises a hollow rectangular member having a bottom wall 12 (facing the viewer in the vertical position), opposing side walls 13, opposing end walls 14, and an outwardly curved top wall 15. For case of understanding, the dimensions would be slightly less than the payload bay interior to facilitate installation and removal, but for purposes of illustration and example, the dimensions will be referred to as approximately 60 ft. long by 15 ft. wide and 15 ft. in height. Such a module would provide approximately 12,050 cu. ft. of usable space.

FIG. 3 illustrates other basic module shapes, such as a hollow cylindrical module 16 approximately 60 ft. long and 15 ft. in diameter having a cylindrical side wall 17 and opposed end walls 18. A cylindrical module would provide approximately 10,600 cu. ft. of usable space. Also shown in FIG. 3 and represented by dotted line is a rectangular module 19, having four opposed side walls 20 and opposed end walls 21 forming a square transverse cross section. The rectangular module 19 would be approximately 15 ft. square and 60 ft. long and would provide approximately 13,500 cu, ft. of usable space.

FIGS. 4 and 5 illustrate modifications of two basic shapes in transverse cross section wherein the bottom wall of the module 11 has been removed, and the side walls 13 are slightly tapered so that a plurality of the modified modules 11a may be stacked within the payload bay. Similarly, in FIG. 5, the cylindrical module 16 may be divided into several semi-circular segments 16a for stacking purposes.

As shown in FIGS. 6 and 7, a plurality of modules 11 are joined laterally by connecting their side walls 13 to form exterior side walls 22, 23, 24, and 25. Another plurality of modules 11 are joined to the end walls 14 of the previously joined modules forming top and bottom walls 26 and 27 respectively. The walls 22–25, 26 and 27 thus joined enclose a large interior space to provide a central common area 28. The modules may be joined by methods conventional in the art, such as by clamping, bolting, magnetism, or tongue and grooves. Although not illustrated, it should be understood that the cylindrical modules would be joined in a similar fashion, but with somewhat less actual module area due to the cylindrical walls.

FIG. 8 shows a cross section through a pair of adjoining modules 11. Each of the modules may be independently pressurized until a suitable number have been joined. Airtight seals 29 may be installed between the mating surfaces when adjoining them such that the large enclosed area 28 may also be pressurized. The central enclosure pressure seal may also be accomplished by providing an exterior covering on each module of suitable material which will form an airtight seal when two modules are joined together. Optionally, passageways 30 may be installed through the side walls 13 and/or the bottom wall 12 to allow occupants to travel between the modules and/or between the individual modules and the large central enclosure 28. The passageways 30 are preferably in the form of an airlock so that communication between selective modules and the central enclosure 28 may be closed during construction or in the event that a pressure leak should develop.

Each individual module may be self sufficient to support life and provide living quarters as more modules are added with subsequent shuttle flights. Also various modules may be equipped for a special purpose, such as living quarters, mechanical, life support system, food supply or storage, etc.

Figure 9:
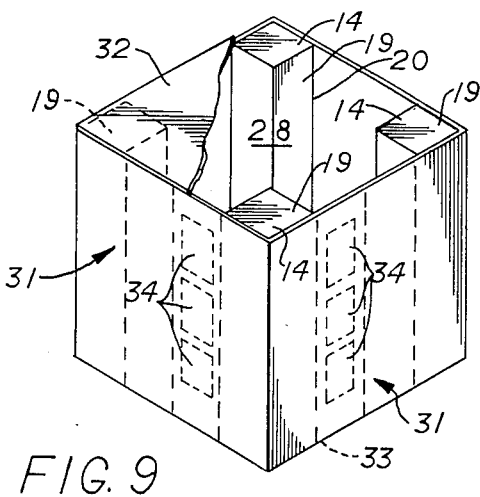
FIG. 9 is an isometric view of four modules joined by panels to form a space station having a central common enclosure.

FIG. 9 shows four hollow rectangular modules 19 of the type previously described with reference to FIG. 3 placed in spaced apart parallel relation to form corner columns and connected together by a plurality of panels 31 joined to the side walls 20 to extend between the spaced modules. Similarly, panels 32 and 33 are joined to the top and bottom ends 14 of the modules and top and bottom edges of the panels 31 to form a cube-shaped space station having an enclosed common central interior area 28. A station of the type depicted in FIG. 9 would provide a total module area of 54,000 cu. ft. and an enclosed area of 216,000 cu. ft.

The panels 31 used in the space station construction preferably coincide with the dimensions of the basic module and comprise a folded panel 60 ft. long in sections approximately 15 ft. wide which unfold to lock into a rigid panel approximately 60 ft. by 60 ft. square. The surface of the panels may also contain energy gathering cells 34 such as solar cells, or be comprised of radiation or heat deflecting materials to capture the vast energy available in outer space for use inside the space station or which may be converted inside the space station to a form suitable for sending to the earth. Obviously, the versions utilizing panels would provide a central enclosure in fewer trips. Such a station could also be constructed very quickly by using four shuttles.

Figure 10:
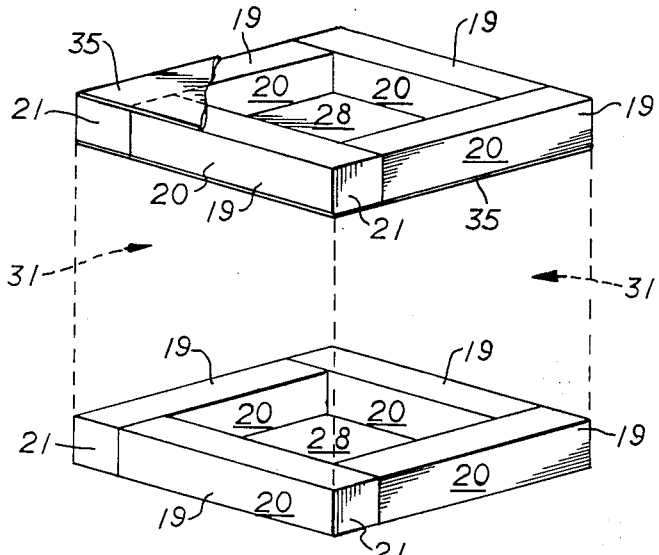
FIG. 10 is a diagrammatic and isometric view of a series of modules having their ends joined to the side walls of like modules forming a square ring configuration and covered by panels to form a space station having a central common enclosure.

Another space station configuration utilizing the rectangular modules 19 is shown in FIG. 10. The end wall 14 of one rectangular module 19 is joined to the side wall 20 of another module and repeated at each corner to form a square ring. Panels 35 are joined to the top and bottom surfaces of the square ring shape to enclose a common central area 28 and form the exterior top and bottom walls of the space station. Several of the square ring space stations may then be stacked in layers for form a plurality of layers or floors, similar to an office building. A single layer square ring station of the type depicted in FIG. 10 would provide a total module area of 54,000 cu. ft. surrounding a central enclosed area of 13,500 cu. ft., for a total area of 67,500 cu. ft. It should also be understood that the square rings may be spaced apart and joined by panels 31 forming side walls as indicated in dotted line to greatly increase the total enclosed area.

Figure 11:
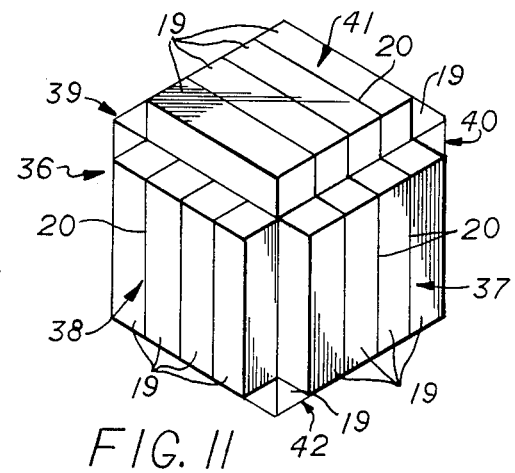
FIG. 11 is an isometric view of a plurality of modules joined together to form a space station having a central common enclosure.

FIG. 11 shows a cube shaped space station 36 similar to that described in reference to FIGS. 6 and 7, utilizing the square cross sectioned modules 19. A plurality of modules 19 are joined laterally by connecting their side walls 20 to form exterior side walls 37, 38, 39, and 40. Another plurality of laterally joined modules 19 are joined to edges of the previously joined modules forming top and bottom 41 and 42 respectively. The walls 37–40, 24 and 42 made up of modules 19 and thus joined enclose a large interior space to provide a central common area.

With the embodiment of FIG. 11, 24 modules (four per side) approximately 15 ft. by 15 ft. by 60 ft. long would provide an outer area (total module area) of 324,000 cu. ft., and a central enclosure of 216,000 cu. ft. resulting in total usable area of 540,000 cu. ft. whereas the equivalent number of cylindrical modules of the prior art wheel and clustered module space stations (assumed to be 60 ft long by 15 ft. in diameter) would provide only 254,000 cu. ft. with no central enclosure.

Figure 12:
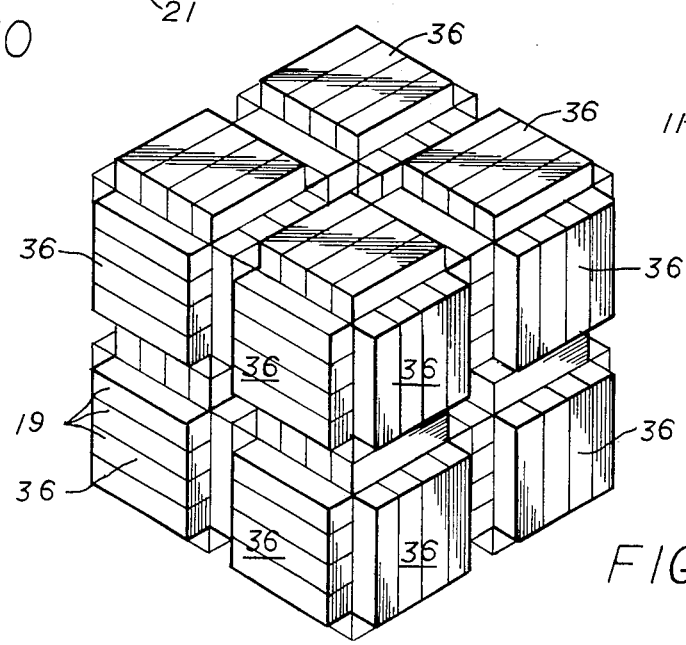
FIG. 12 is an isometric view of a plurality of space stations of the embodiment of FIG. 11 joined together to form a larger space station having several common enclosures.

After one modular space station has been formed then other modules may be added to the structure, or several stations joined together to form larger modular structures. For example, FIG. 12 illustrates a giant cubic space station formed by joining eight of the previously described cube shaped space stations 36. The cube shaped space stations 36 could also be spaced apart to form the corners of an even larger cube which would be enclosed by panels in the manner previously described.

The space station depicted in FIG. 12, would provide eight sub-enclosures each having a module area of 324,000 cu. ft., a central enclosure of 216,000 cu. ft., and total usable area of 540,000 cu. ft. The resulting large space station would thus provide a total module area of 2,592,000 cu. ft., and total enclosure area 4,320,000 cu. ft. This usable area would be contained within a cube shaped space station approximately 180 ft. square.

Figure 13:
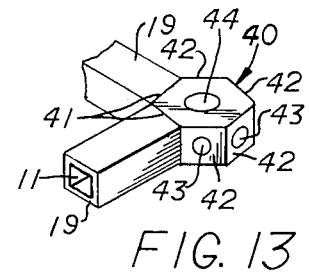
FIG. 13 is a partial isometric view of a pair of modules joined by a docking module.

The exterior surfaces of the previously described modules may be modified to provide a berthing or docking port for self propelled vehicles. As shown in FIG. 13, adapter modules 40 having one or more side walls 41 adapted to be secured to the ends or corners of the modules may be attached thereto for various purposes. The adapter modules 40 have outwardly angular side walls 42 which may be modified to provide berthing or docking ports 43 for docking space craft to the modules or modular space stations. The exterior surface of the adapter modules 40 may also serve as the means by which thrust generating, communication and energy gathering devices 44 may be affixed to the individual module, or to a convenient surface or corner of a space station assembly.

By enclosing a central common area, the present invention is a highly efficient and utilitarian use of modular construction not provided in modular systems such as wheel-like structures and "clustered module" aggregations and conglomerations which have a central open frame structure with various cylindrical modules spaced apart thereon and connected together by a network of pressurized tubes. The efficient use of space is diminished in these systems due to the fact that the total usable area is linear, resulting in crowded habitable quarters, and there is no common central enclosure.

It should be obvious from the foregoing description that the modular construction as herein described will provide the maximum amount of usable space with a minimum amount of materials and labor.

While this invention has been described fully and completely with special emphasis upon several preferred embodiments, it should be understood that within the scope of the appended claims the invention may be practiced otherwise than as specifically described herein.

I claim:

1. A space station structure assembled in orbit comprising;
   a plurality of hollow modules transported into orbit by rocket and peripherally joined in a predetermined pattern to form a complete enclosure about a common interior volume, without an interior supporting framework.

2. A space station structure according to claim 1 in which
   said modules are transported into orbit in the payload bay of a space shuttle.

3. A space station structure according to claim 1 in which
   said modules joined side by side form at least one exterior side wall for said enclosure.

4. A space station structure according to claim 1 in which
   a first plurality of said modules are joined side by side to form four exterior side walls for said enclosure, and
   a second plurality of said modules are joined side by side to form top and bottom walls for said enclosure and their ends joined to the top and bottom ends of said first plurality of said modules to form a substantially cubic enclosure.

5. A space station structure according to claim 1 in which
   exterior surfaces of certain ones of said plurality of modules include a docking port for connecting self propelled vehicles to the enclosure.

6. A space station structure according to claim 1 further including
   adapter modules secured to certain ones of said modules and having docking ports for connecting space craft to the enclosure.

7. A space station structure according to claim 1 further comprising
   adapter modules secured to certain ones of said modules and having thrust generating means for propelling said enclosure.

8. A space station structure according to claim 1 further comprising
   adapter modules secured to certain ones of said modules and having communication means for transferring information between said enclosure and another point.

9. A space station structure according to claim 1 further comprising
   adapter modules secured to certain ones of said modules and having energy gathering means for gathering energy present in the enclosure environment.

10. A space station structure according to claim 1 in which
    said modules are enclosed hollow polygonal members.

11. A space station structure according to claim 1 in which
    said modules are enclosed hollow generally rectangular members.

12. A space station structure according to claim 1 in which
    said modules are enclosed hollow generally cylindrical members.

13. A space station structure according to claim 1 in which
    said modules are enclosed hollow rectangular members having at least one outwardly convex arcuate side wall.

14. A space station structure according to claim 1 in which
    said modules have passageways in their surfaces sealed for selective communication with adjacent modules.

15. A space station structure according to claim 1 in which
    said modules have passageways incorporated into their surfaces facing said enclosed central interior volume and sealed for selective communication with said central interior volume.

16. A space station structure according to claim 1 including
    sealing means installed between mating surfaces of said modules forming an airtight seal about the enclosed central interior volume.

17. A space station structure according to claim 16 in which
    said sealing means comprises an exterior covering on each module forming an airtight seal when two modules are joined together.

18. A space station structure having a plurality of enclosed areas and erected in earth orbit from modules transported into orbit by rocket comprising;
    a first plurality of hollow modules transported into orbit by rocket and peripherally joined in a predetermined pattern to form a complete enclosure about a common interior volume forming a first space station assembly having an enclosed central interior volume, and
    a plurality of such said space station assemblies joined together to form a larger space station having a plurality of enclosed central interior volumes.

19. A method of creating a habitable enclosure in outer space comprising the steps of;
    constructing a series of hollow modules on the earth's surface,
    transporting said modules by rocket into earth orbit,
    deploying said modules in earth orbit, and
    joining a plurality of said modules peripherally in a pattern to form a complete enclosure about a common interior volume.

20. A method according to claim 19 in which
    said modules are constructed in a geometry closely following the interior of the payload bay of a space shuttle,
    said modules are transported in a space shuttle into earth orbit, and
    said modules are deployed from the payload bay of said shuttle in earth orbit and joined to enclose said common interior volume.

21. A method according to claim 19 including the steps of joining a first plurality of said modules peripherally in a pattern to form a complete enclosure about a common interior volume forming a first space station having an enclosed central interior volume, joining one or more subsequent plurality of said modules peripherally in a pattern to form subsequent space stations having enclosed central interior volumes, and joining said first and said subsequent space stations together to form a larger space station having a plurality of enclosed central interior volumes.

22. A method according to claim 19 in which
said plurality of modules are joined side by side to form at least one exterior side wall for said enclosure.

23. A method according to claim 19 including the steps of joining a first plurality of said modules side by side to form four exterior side walls for said enclosure, and joining a second plurality of said modules side by side to form top and bottom walls for said central interior volume and joining their ends to the top and bottom ends of said first series to form a substantially cubic enclosure.

24. A method according to claim 19 including the step of providing the exterior surfaces of certain ones of said plurality of modules with a docking port for connecting self propelled vehicles to the enclosure.

25. A method according to claim 19 including the step of securing adapter modules provided with docking ports to certain ones of said plurality of modules for connecting space craft to said enclosure.

26. A method according to claim 19 including the step of securing adapter modules having thrust generating means to certain ones of said modules for propelling said enclosure.

27. A method according to claim 19 including the step of securing adapter modules having communication means to certain ones of said modules for transferring information between said enclosure and another point.

28. A method according to claim 19 including the step of securing adapter modules having energy gathering means to certain ones of said modules for gathering energy present in the enclosure environment.

29. A method according to claim 19 including the step of installing pressure-tight passageways into the surfaces of said modules.

* * * * *